INVENTOR.
DONALD D. KALLENBACH
BY Christie, Parker & Hale
ATTORNEYS

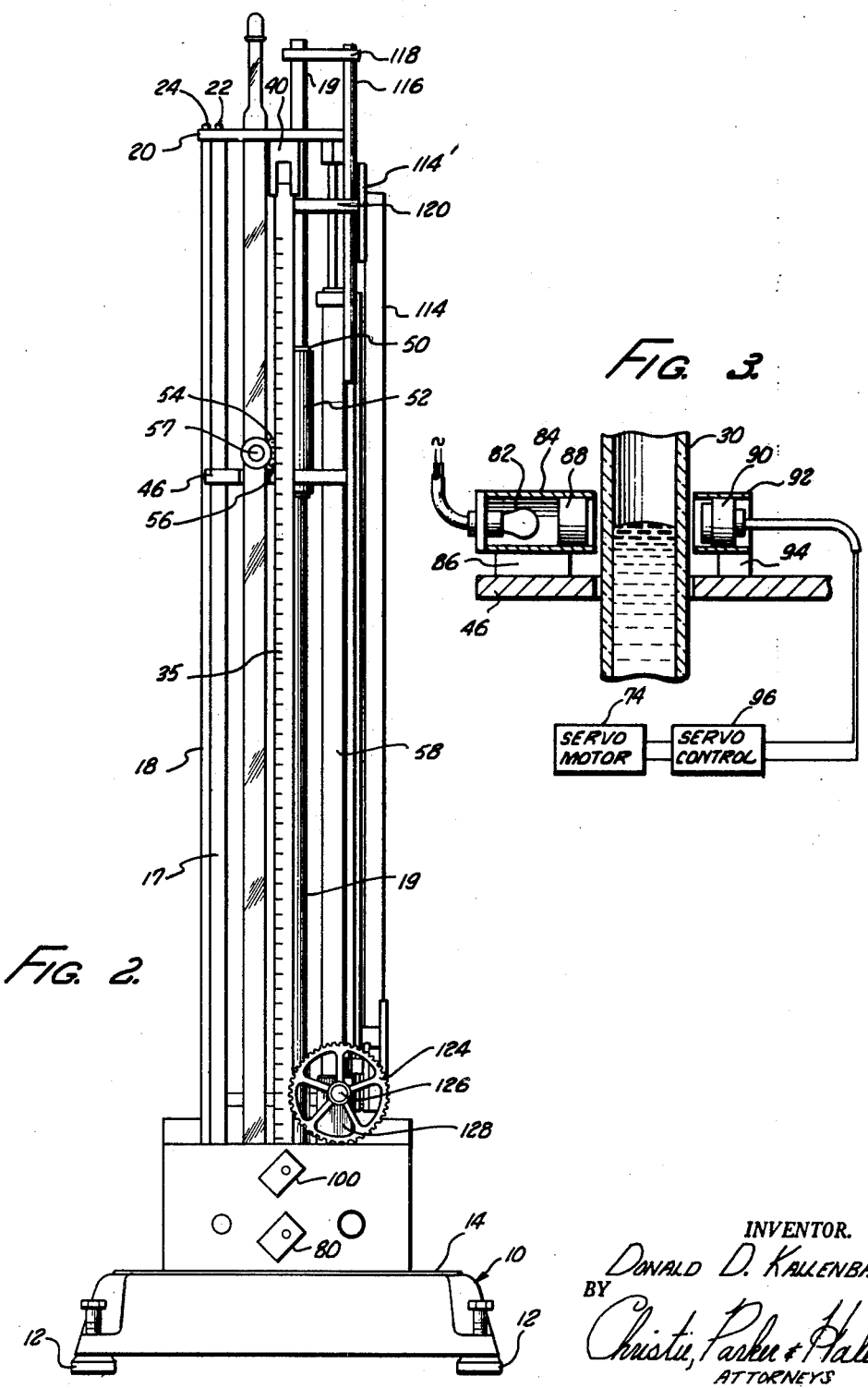

April 7, 1964   D. D. KALLENBACH   3,127,772
BAROMETER FOR INDICATING SEA LEVEL PRESSURE
Filed June 6, 1960   3 Sheets-Sheet 3
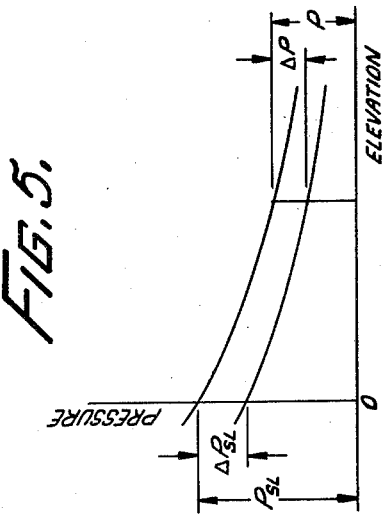
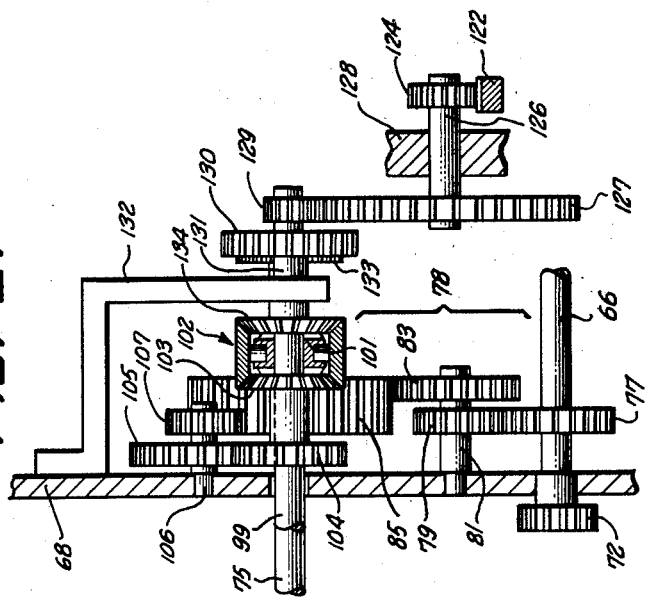
INVENTOR.
DONALD D. KALLENBACH
BY
Christie, Parker & Hale
ATTORNEYS

United States Patent Office 3,127,772
Patented Apr. 7, 1964

3,127,772
BAROMETER FOR INDICATING SEA LEVEL
PRESSURE
Donald D. Kallenbach, Cheyenne, Wyo., assignor to Royal Industries, Inc., Los Angeles, Calif., a corporation of California
Filed June 6, 1960, Ser. No. 34,311
7 Claims. (Cl. 73—385)

This invention relates to barometers and, more particularly, to a mercury column barometer which provides automatic readout corrected to equivalent sea level pressure.

It is well known that barometric pressure varies with altitude as well as with atmospheric conditions. A change in pressure with change in altitude provides the basis on which conventional altimeters for aircraft operate. The conventional altimeter may be set in one of two ways. It may be set to the correct altitude when the plane is on the field. Then, assuming the atmospheric conditions remain stable, as the airplane flies about changing altitude, the altimeter indicates the changes in altitude in response to changes in the measured air pressure. Alternatively, the altimeters are provided with a calibrated adjustment which can be set to the pressure at sea level. If the sea level pressure is known, the altimeter can then be set to read the correct altitude. Once set, the altimeter shows correct altitude only if atmospheric pressure conditions remain the same. Any subsequent change in the atmospheric pressure due to changing weather conditions or the like introduces an error in the altitude reading of the altimeter.

For this reason, it is routine procedure for a pilot to receive information from the airfield as to the sea level barometric pressure before landing. He can then set his altimeter accordingly, so as to obtain a correct altitude indication before attempting to land. It has been the practice heretofore to measure the ambient atmospheric pressure at ground level of the airport. Then, by suitable published conversion tables, knowing the elevation of the airfield, and equivalent sea level barometric pressure can be calculated and relayed to approaching aircraft getting ready to land.

The present invention provides a barometer that may be read out directly, giving the ambient pressure in inches of mercury. It further provides means for automatically reading out in equivalent sea level barometric pressure. Thus the present invention, in providing a direct indication of barometric pressure corrected to sea level, provides information in a form which can be relayed directly to the pilot for setting his altimeter without any conversion factor being calculated. The chance for human error in converting from ambient pressure to sea level pressure is completely eliminated. The barometer can be set to operate automatically at any elevation by a simple calibrated adjustment which is set according to the elevation in feet of the location of the barometer.

In brief, the present invention provides apparatus for measuring ambient pressure and indicating the corresponding sea level pressure, the apparatus including a vertical tube sealed at its upper end in which a column of mercury is supported by air pressure. Means movable along the vertical tube senses the top of the liquid column. Servo drive means responsive to the sensing means automatically positions the sensing means in alignment with the top of the mercury column as the level of the column rises and falls in the tube. An indicator for directly indicating sea level pressure is driven by a mechanical drive arrangement including a calibrated adjustment means which is arranged to automaticaly convert ambient pressure into a sea level pressure indication with the proper setting of the adjustment means according to the elevation of the location of the apparatus.

For a more complete understanding of the invention, reference should be made to the accompanying drawings, wherein:

FIG. 2 is a front elevational view of the same embodiment of the invention;

FIG. 3 is a schematic showing of the servo positioning control;

FIG. 4 is a partial top view showing the gear train employed; and

FIG. 5 is a series of curves showing the relation of pressure to elevation.

Figure 1:
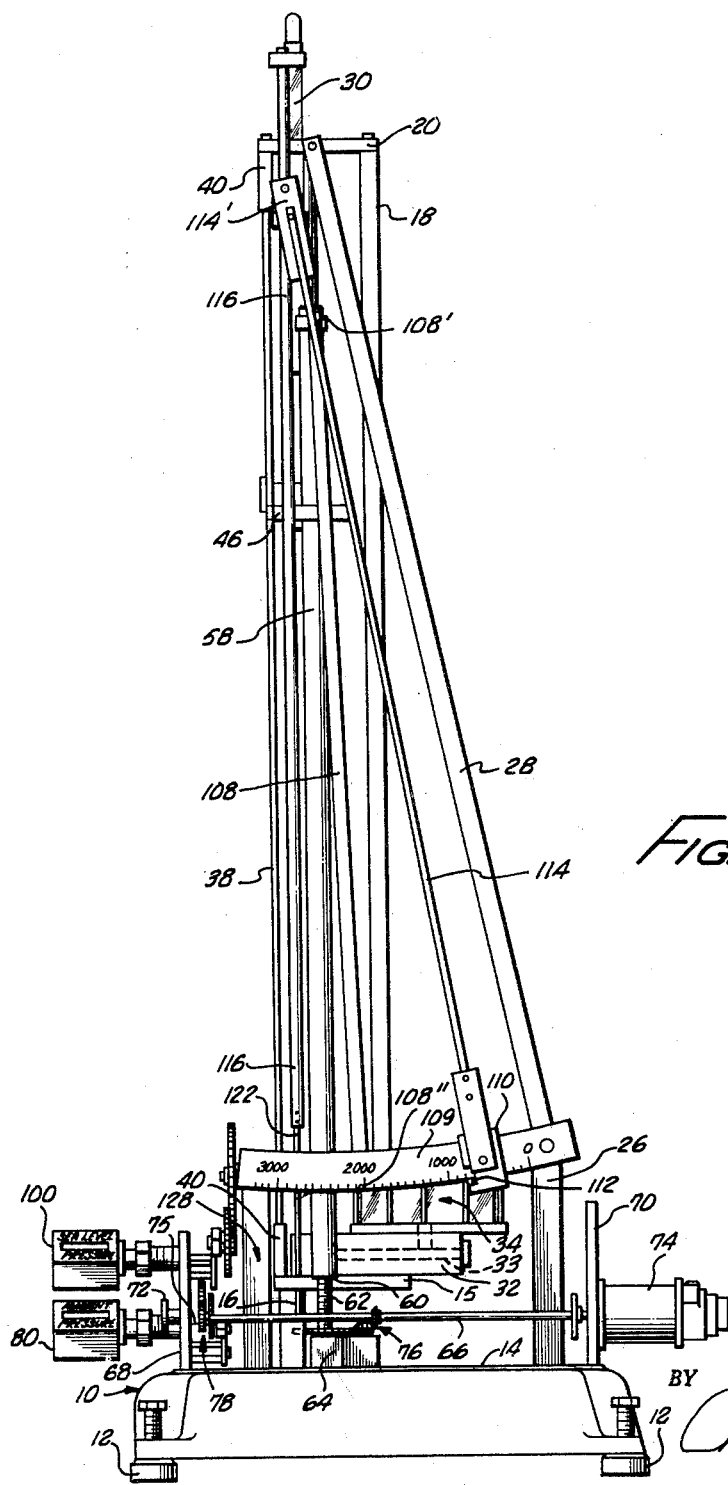
FIG. 1 is a side elevational view of one embodiment of the present invention.

Referring to the form of the invention as shown in FIGS. 1 and 2, the numeral 10 indicates generally a base which is supported on adjustable legs 12 by which the base can be mounted with its top surface in a level position. Secured to the upper flat face 14 of the base 10 is a lower frame plate 15 supported by a pair of posts 16. Mounted on the lower frame plate 15 are three vertical rods 17, 18 and 19. An upper frame plate 20 is bolted to the top end of the vertical rods 17 and 18, as by machine bolts 22 and 24, respectively. The rod 19 extends through an opening in the upper frame plate 20. In addition, a support bar 26 is mounted on the back portion of the upper surface 14 of the base 10 and a strut 28 is secured at its lower end to the bar 26 and its upper end to the upper frame plate 20 to provide lateral bracing for the vertical assembly.

A hollow glass tube 30 extends from above the upper frame plate 20 parallel to the vertical rods 17 and 18. The tube passes through an opening in the upper plate 20 to support it against lateral movement. The lower end of the glass tube 30 engages an opening in a horizontal block 32 in sealed relationship thereto. The block 32 is provided with an internal horizontal passage 33 which communicates with a mercury reservoir indicated generally at 34. Because the top of the tube 30 is sealed off and a vacuum exists above the mercury column, the column of mercury is supported in the tube from air pressure on top of the mercury in the reservoir 34, the height of the mercury column being determined by the ambient air pressure on the mercury in the reservoir. The entire assembly, including the mercury reservoir 34, the horizontal block 32 and the tube 30, is supported from the lower frame plate 15.

Extending alongside the tube 30 is a vertical bar 38 which is calibrated in inches. The vertical calibrated bar is adjustably supported at its upper and lower end in suitable brackets 40 which are respectively bolted to the upper plate 20 and the lower plate 15.

A scanner assembly, shown more in detail in FIG. 3, includes a scanner mounting plate 46 having openings through which the vertical rods 17, 18 and 19 pass. The scanner mounting plate 46 includes a notch region passing around the mercury tube 30. The vertical rod 19 provides a guide and lateral support and is engaged for relative sliding movement by an elongated sleeve bearing 50 supported in a tube 52 secured to the scanner mounting plate 46. An indexing plate 54 having a marker 56 cooperates with the scale on the vertical bar 38 to give a visual reading of barometric pressure when the scanner assembly is properly positioned with relation to the top of the mercury column in the tube 30. An eyepiece 57, mounted on the plate 46, may be used to visually check the position of the scanner in relation to the top of the mercury column.

Vertical movement is imparted to the scanner assembly by means of a linkage including a hollow tube 58 which is secured to the mounting plate 46 of the scanner assembly. The lower end of the tube 58 is provided with an inserted threaded nut 60 which engages a lead screw 62. The lower end of the lead screw is supported by a suitable thrust bearing (not shown) mounted in a block 64.

The lead screw 62 is actuated through a drive shaft 66 journalled at one end in a front mounting plate 68 and in the other end in a rear mounting plate 70. The front end of the drive shaft, where it extends through the front plate 68, is provided with a knurled knob 72 by means of which the shaft can be manually turned. The other end of the shaft 66 is driven by an electric servo motor 74 in a manner hereinafter more fully described. A gear train, indicated generally at 76, provides a positive drive between the shaft 66 and the lead screw 62. Thus rotation of the drive shaft 66 imparts a vertical movement to the scanner assembly.

The shaft 66 connects through a gear train, indicated generally at 78, to the drive shaft 75 of a digital readout indicator 80 mounted on the front of the vertical plate 68. The gear train 76 and gear train 78 are arranged in relation to the pitch of the lead screw 62 so that the digital indicator directly reads in thousandths of an inch the vertical movement of the scanner assembly. Thus, when the scanner assembly is properly aligned with relation to the top of the mercury column, the digital indicator 80 reads directly in inches of mercury the ambient pressure. The gear train 78 is shown in more detail in FIG. 4 and includes a gear 77 on the shaft 66 which engages a gear 79 on an idler shaft 81. The gear 79 rotates a gear 83 on the same shaft which in turn engages a gear 85 on the shaft 75 of the indicator 80.

Referring to FIG. 3, the scanner assembly is shown in more detail. The scanner assembly includes a light source comprising a light bulb 82 positioned in one end of a tube 84 which is supported above the scanner plate 46 by a suitable bracket 86. A lens system 88 directs a focused beam of light through the transparent barometer tube 30. A photodiode element 90 is illuminated by the beam of light, the photodiode element being mounted inside a tube 92 supported from the scanner plate 46 by a suitable bracket 94. The photodiode element 90 produces a signal which varies with the amount of incident light falling on it. As the mercury column moves up and down in the tube 30, it intercepts the beam of light, thus varying the amount of light falling on the photodiode 90.

A signal from the photodiode element 90 is applied to a conventional servo control circuit 96 for driving the servo motor 74. The output of the servo control 96 goes to zero when the mercury column partially intercepts the beam of light. As the mercury column rises in the tube, cutting off more light, a signal is derived from the servo control circuit 96 which drives the servo motor 74 in one direction. When the mercury column drops and the amount of light on the photodiode element 90 increases, the direction of the servo motor 74 is reversed. The servo motor, acting through the drive shaft 66, gear train 76 and lead screw 62, tries to position the scanner assembly so as to reduce the output from the servo control circuit 96 to zero. Any change in the height of the mercury column produces a correction through the servo motor drive for repositioning the scanner assembly to again reduce the output of the servo control circuit 96 to zero. In this manner, the angular position of the shaft 66 is maintained proportional to the height of the mercury column in the tube 30.

In order to derive an equivalent sea level pressure for a particular ambient pressure condition, a special linkage arrangement is provided which includes an adjustable setting for elevation of the instrument above sea level. The linkage arrangement controls a second digital indicator 100 mounted on the front plate 68 for reading directly the equivalent sea level pressure. The drive shaft 99 of the indicator 100 is connected to the spider 101 of a differential gear assembly indicated generally at 102 (see FIG. 4). One of the differential drive gears 103 is connected to a gear 104 journalled on the shaft 99. The gear 104 rotates another gear 105 journalled on a shaft 106. The gear 105 is connected to a gear 107 that engages the gear 85. In this manner, the shaft 66 drives an input to the differential 102. This gear drive is arranged such that when the other differential input is held stationary, the digital indicators 80 and 100 change by the same amount. This is the condition which pertains when the instrument is operated at sea level elevation, so that sea level pressure and ambient pressure are the same. A correction for elevations other than sea level is provided through the second input gear of the differential assembly 102.

This is accomplished by a lever system including a drive link 108 which is pivotally connected at its upper end 108' to the scanner assembly positioning rod 58. At its lower end 108'', the compensator link 108 is pivotally connected to an arcuate shaped bar 109. The arcuate bar 109 is normally held at a substantially horizontal position by being pivotally supported at one end from the vertical bar 26.

A slide member 110 is movable along the length of the arcuate bar 109. A scale along the length of the bar 109 is calibrated in feet of elevation. An index mark 112 is positioned by movement of the slide member 110 to the elevation setting corresponding to the elevation above sea level at which the barometer instrument is located.

The slide member 110 is connected by a long driven link 114 to a vertically movable rod 116. The upper portion of the rod 116 passes through an upper guide element 118 supported from the top of the vertical rod 19. A lower guide member 120 also supported by the vertical support rod 19 acts as a second guide for the vertical rod 116. The upper end 114' of the driven link 114 is pivotally secured to the rod 116 at a point between two guide members 118 and 120 mounted on the vertical support shaft 19. The rod 116 is guided for vertical movement through holes in the guide members 118 and 120.

Secured to the lower end of the rod 116 and in axial alignment therewith is a gear rack 122 which engages a pinion 124 carried by a shaft 126 which is journalled in a vertical support block 128 mounted on the base 10 (see FIG. 4). Thus vertical movement of the rod 116 imparts rotation to the shaft 126 through the rack 122 and pinion 124.

The shaft 126 is connected through a gear train to the second input gear of the differential gear assembly 102. This gear train includes a large gear 127 mounted on the shaft 126 which engages a gear 129. The gear 129 is connected to a gear 130 that is journalled on a common shaft 131. The shaft is supported by a bracket 132. The gear 130 in turn engages a gear 133 journalled on the shaft 99 and connected to the other differential input gear 134. In this manner, it will be seen that the rotation of the sea level indicator 100 is modified by the action of the compensating linkage.

In particular, the operation of the above-described apparatus is as follows. As changes in ambient barometric pressure take place, the scanner assembly is caused to follow movements of the mercury column through rotation of the drive shaft 66 by the servo motor 74. These changes in the height of the mercury column are indicated directly in thousandths of an inch by the digital indicator 80. Movement of the scanner assembly in following changes in the height of the mercury column also results in a vertical component of movement of the free end of the substantially horizontal arcuate bar 109 through the action of the drive link 108. Depending upon the position of the slide member 110, a substantially proportional up-and-down movement is imparted to the rod 116 through the driven link 114. By means of the differential gear arrangement, rotation of the digital indicator 100 is made proportional to the combined rotations of the drive shaft 66 and the rotations imparted to the shaft 126 by the compensating linkage.

A scale for elevation settings is arranged with zero elevation corresponding to the position of the slide member 110 at the pivotal support location of the arcuate bar 109. In this position, no motion is produced in the driven link 114 by rotation of the arcuate bar 109 about its pivot. Thus no rotation of the shaft 126 is effected, and the sea level indicator 100 and the ambient pressure indicator 80 are rotated in synchronism with changes in barometric pressure.

With any other setting of the slide member 110 corresponding to elevations above sea level, a rotation of the shaft 126 is produced through the linkage including the arcuate bar 109. The motion of the shaft 126 is added to the motion of the shaft 66 through the differential 102. The change in ambient pressure due to a change in atmospheric conditions is not the same at all elevations but is approximately proportional to the standard pressure for that altitude. This may be expressed as $$\frac{\Delta Psl}{Psl} \cong \frac{\Delta p}{p}$$

where $Psl$ is the pressure at sea level and $p$ is the pressure at some other elevation. FIG. 5 shows a series of curves of pressure as a function of altitude.

The indicator 80 gives a direct measure of $p$ at the elevation of the instrument. For the indicator 100 to provide the corresponding sea level pressure $Psl$, the linkage and gear trains must automatically put in the proportionality factor $$\frac{\Delta p}{\Delta Psl}$$

which may be considered substantially a constant for any given elevation of the instrument. This factor is introduced by way of the differential and associated gear train and the compensating linkage. It can be shown that $$\frac{\Delta p}{\Delta Psl} = k\frac{a}{a+x}$$

where $a$ is the distance along the arcuate bar 109 from the pivot support to the point 108″ where the end of the drive link 108 is secured to the arcuate rod and where $x$ is the distance from the pivot support to the point where the drive link 114 is secured to the slide 110. This assumes that the bar 109 is operated over a small angle about its substantially horizontal position and the drive links are made long in relation to the amount of movement of the linkage system. If $x$ is zero, it will be seen that the ratio $$\frac{\Delta p}{\Delta Psl}$$

is unity, corresponding to sea level elevation of the instrument.

The scale on the bar 109 can be laid out from standard altitude v. pressure tables, such as provided in NACA Technical Note No. 3182. In this manner, the instrument can be calibrated in units of elevation. One adjustment is made for elevation when the instrument is set up at a particular location, and the instrument then automatically reads out pressure corrected to sea level.

What is claimed is:

1. A barometer instrument comprising a vertical tube sealed at its upper end, a column of liquid supported in the tube by air pressure, means movable along the vertical tube including means for sensing the top of the liquid column, servo drive means responsive to the sensing means for positioning the movable means in relation to the top of the liquid column, whereby the position of the movable means is maintained in fixed relation to the top of the liquid column, differential drive means having two inputs and an output, pressure indicating means coupled to the output of the differential drive means, mechanical drive means for driving one input of the differential directly from the servo drive means, and a sea level correcting drive means coupling the other input to the differential drive means to the servo drive means including a calibrated bar pivotally supported at one end, an elongated drive link connecting said means movable along the vertical tube with the bar at a point remote from the pivotal support, the link imparting pivotal movement to the bar with movement of said means movable along the vertical tube, and adjustable slide movable along the bar, a vertically movable rod member extending parallel to the vertical tube, an elongated link member connecting the slide and the rod member for imparting movement to the rod member, and means for driving the other input of the differential drive means directly from the rod member.

2. A barometer instrument comprising a vertical tube sealed at its upper end, a column of liquid supported in the tube by air pressure, means movable along the vertical tube including means for sensing the top of the liquid column, means for positioning the movable means in relation to the top of the liquid column, whereby the position of the movable means may be maintained in fixed relation to the top of the liquid column, differential drive means having two inputs and an output, pressure indicating means coupled to the output of the differential drive means, mechanical drive means for driving one input of the differential drive means directly from the positioning means, and a sea level correcting drive means coupling the other input to the differential drive means to the positioning means including a calibrated bar pivotally supported at one end, an elongated drive link connecting said means movable along the vertical tube with the bar at a point remote from the pivotal support, the link imparting pivotal movement to the bar with movement of said means movable along the vertical tube, an adjustable slide movable along the bar, a vertically movable rod member extending parallel to the vertical tube, an elongated link member connecting the slide and the rod member for imparting movement to the rod member, and means for driving the other input of the differential drive means directly from the rod member.

3. Apparatus for indicating changes in sea level pressure in response to changes in ambient pressure comprising a vertical tube sealed at its upper end, a column of liquid supported in the tube by air pressure, means movable along the tube for sensing the top of the column, drive means responsive to the sensing means for moving the sensing means with changes in the level of the top of the column including first means for producing a movement proportional to the variations in ambient pressure, a differential device having two inputs and an output, indicating means actuated by the output of the differential device, means for actuating one input of the differential device in response to the movement of said first movement producing means, second means responsive to movement of the sensing means for producing a movement proportional to variations in ambient pressure, said second means including means for adjusting the proportionality factor of said second means, and means for actuating the other input of the differential device in response to the movement of said second movement producing means.

4. Apparatus for indicating changes in sea level pressure in response to changes in ambient pressure comprising movable means having an output for sensing variations in ambient pressure, first means responsive to the sensing means output for producing a movement proportional to the variations in ambient pressure and for moving the sensing means to reduce the sensing means output, a differential device having two inputs and an output, indicating means actuated by the output of the differential device, means for actuating one input of the differential device in response to the movement of said first movement producing means, second means responsive to movement of the sensing means for producing a movement proportional to variations in ambient pressure, said second means including means for adjusting the proportionality factor of said second means, and means for actuating the other input of the device in response to the movement of said second movement producing means.

5. A barometer instrument comprising a vertical tube sealed at its upper end, a column of liquid supported in the tube by air pressure, column height monitoring means movable along the vertical tube including means for sensing the top of the liquid column, servo drive means responsive to the monitoring means for moving the monitoring means to maintain a fixed relation between the monitoring means and the top of the column, differential drive means having first and second inputs and an output, first drive means for driving the first input of the differential drive means directly from the servo drive means, second drive means for driving the second differential drive means input in response to motion of the monitoring means, the second drive means including means for modifying motion of the monitoring means at the second differential drive means input in proportion to the altitude of the instrument above sea level, and pressure indicating means coupled to the output of the differential drive means for indicating barometric pressure at the instrument corrected to sea level.

6. A barometer instrument comprising a vertical tube sealed at its upper end, a column of liquid supported in the tube by ambient air pressure, column height monitoring means movable along the vertical tube including means for sensing the top of the liquid column, servo drive means responsive to the monitoring means for moving the monitoring means to maintain a fixed relation between the monitoring means and the top of the column, differential drive means having two inputs and an output, first drive means for driving one input of the differential drive means directly from the servo drive means, second drive means coupled between the monitoring means and the other differential drive means input and responsive to motion of the monitoring means for driving the other differential drive means input including means for modifying motion of the monitoring means at the other differential drive means input in proportion to the altitude of the instrument above sea level, first pressure indicating means coupled to the output of the differential drive means for indicating barometric pressure at the instrument corrected to sea level, and second pressure indicating means operably connected to the first drive means for indicating ambient barometric pressure.

7. A barometric instrument comprising a base, barometer means mounted to the base and having a portion thereof movable relative to the base in response to changes in ambient barometric pressure, movable sensing means coupled to said barometer means portion for generating an output signal indicative of the separation of the sensing means from a predetermined relation with said barometer means portion, drive means responsive to the sensing means output signal for moving the sensing means to maintain the predetermined relation, differential drive means having two inputs and an output, first drive means for driving one input of the differential drive means directly from the drive means, second drive means coupled between sensing means and the other differential drive means input and responsive to motion of the sensing means for driving the other differential drive means input including means for modifying motion of the sensing means at the other differential drive means input in proportion to the altitude of the instrument above sea level, and pressure indicating means coupled to the output of the differential drive means for indicating barometric pressure at the instrument corrected to sea level.

References Cited in the file of this patent

UNITED STATES PATENTS

| | | |
|---|---|---|
| 2,722,641 | Cross | Nov. 1, 1955 |
| 2,818,726 | Amonette et al. | Jan. 7, 1958 |
| 2,922,313 | Penny | Jan. 26, 1960 |
| 3,051,002 | Rawlings | Aug. 28, 1962 |

FOREIGN PATENTS

| | | |
|---|---|---|
| 743,513 | Germany | May 12, 1943 |

OTHER REFERENCES

Article: High Precision Automatic Direct-Reading Barometer. In Instruments, vol. 21, p. 596, July 1948.